United States Patent [19]

Fremont et al.

[11] 4,310,424

[45] Jan. 12, 1982

[54] APPARATUS AND METHOD FOR REMOVING SUSPENDED SOLIDS FROM A STREAM

[75] Inventors: Henry A. Fremont, Wyoming; Mary C. Obenour, Fairfield; Edward F. Hedrick, Loveland, all of Ohio

[73] Assignee: Champion International Corporation, Stamford, Conn.

[21] Appl. No.: 171,947

[22] Filed: Jul. 23, 1980

[51] Int. Cl.³ .............................................. B01D 33/02
[52] U.S. Cl. .................................. 210/791; 210/386; 210/393; 210/401
[58] Field of Search ........ 210/783, 784, 791, 400–404, 210/406–409, 411, 412, 806, 386, 392, 393, 396

[56] References Cited

U.S. PATENT DOCUMENTS

| | | | |
|---|---|---|---|
| 2,583,698 | 1/1952 | Komline | 210/783 |
| 3,244,281 | 4/1966 | Kurz et al. | 210/784 |
| 4,083,778 | 4/1978 | McGrew | 210/671 |
| 4,168,234 | 9/1979 | Hutto | 210/404 |
| 4,212,737 | 7/1980 | Daucher et al. | 210/402 |

Primary Examiner—Ivars C. Cintins
Attorney, Agent, or Firm—Evelyn M. Sommer; John H. Mulholland

[57] ABSTRACT

An apparatus and method for filtering and classifying waste or process streams into three product streams using a polymeric net belt to drive a filter drum and hydrophobic polymeric filter element thereon. A matte of solids is doctored from the belt to provide a first product stream. A roller mounted on a fluid cylinder driven pivoted arm compresses the filter element to provide a smaller suspended solids stream for collection in a trough inside the drum. This second product stream is removed axially from the trough by means of a pump. A third clarified or effluent stream is produced and collected in the drum as the stream passes through the foam filter element. This third stream is removed axially in the direction opposite of said second stream. A shower keeps the foam in the compressed area water filled to prevent vapor lock or gas blockage in the cellular foam filter.

26 Claims, 3 Drawing Figures

APPARATUS AND METHOD FOR REMOVING SUSPENDED SOLIDS FROM A STREAM

BACKGROUND OF THE INVENTION

This invention relates to the removal of suspended solids from waste or process streams. It is suitable for use on streams of untreated waste, primary treated waste or secondary treated waste and can provide an effluent stream which can be returned to its source or recycled for further clarification and treatment. Use of the apparatus and method on waste streams also results in a retained solids stream which can be recycled back to a treatment stage for further clarification. A recyclable separate matte or solids stream is a third product stream of the apparatus and method when used on waste streams.

A process stream containing suspended solids, such as a white water stream from a papermaking machine or a beer stream having excess disbursed carbohydrate solids can also be treated by the apparatus and method of the invention. The products of treatment of a process stream, if so treated, are: a clarified stream which is either an end or intermediate product, a retained solids stream which may be recycled or in some cases further concentrated to produce an end product, or a separate matte stream which either may be recycled or in some cases may be the desired product.

In the case where the apparatus and method are used for removing suspended solids from waste streams, the benefits of high flow rates and a three-stream yield lower the filter surface area required. This provides the ability to process large waste streams within a smaller area and therefore at lower cost. Moreover, the apparatus and method of the invention has the ability to separate large particles such as polyethylene from small particles which might be suspended in the stream. Because of the nature of the foam filtering material and the apparatus and method combination which includes its use, only a low pressure head is required to pass the stream through the filter element. In many cases this will eliminate the need for vacuum equipment, pressurization of the stream or the provision of other complex means and procedures to create a flow through the filter. In those situations where vacuum and pressure equipment are utilized, they may be more efficiently employed by use of the apparatus and method of the invention. For instance, even a slight evacuation of the interior of the apparatus greatly enhances flow rates through the foam filter material.

A further example of the advantages of the apparatus and method of the invention will be seen to result from the novel manner in which the filter medium capacity is recovered or regenerated. To this end, an apparatus and procedure for maintaining the foam area in a substantially liquid filled condition to avoid vapor lock during expansion of the area from the compressed state is employed.

In the case where the invention is utilized as an apparatus for clarification of process streams or for concentrating suspended solids, the advantage of high flow rate is also important. Of primary importance, however, is the ability and method of the apparatus to separate the process stream into three product streams, namely, a clarified stream, a small solids stream and a large solids stream. Again, this is accomplished with a simplicity of equipment made possible by both the low pressure head required to flow the stream through the filter element and the excellent recoverability of the filter medium.

The apparatus and method of the invention may be used either for filtration or classification. It can separate large particles, small particles and hydrogel from the same stream. The apparatus and method can proceed continuously, semi-continuously or on a batch or static basis. It is applicable for use in the tertiary treatment of waste water and/or between the primary and secondary waste treatments. It can separate and concentrate solids, and provide the clarification of liquid and the recycling of solids therefrom. It has application both as an addition to current separation equipment or as a replacement of current equipment.

A related application is entitled "Method of Removing Fine Suspended Solids From Effluent Streams," Ser. No. 154,800, filed May 30, 1980 by Henry A. Fremont and assigned to the same assignee as the instant application. Certain procedures of the prior art analogous to, but not teaching the instant novel apparatus and method are disclosed in *Pulp and Paper Manufacture*, Volume 3, First Edition, entitled "Manufacture and Testing of Paper and Board," McGraw Hill Book Company, Inc., 1953, pages 28–53.

Cellular plastic foams for use as filter elements in the apparatus and method of the invention have been known previously and such technology has been the subject of sales brochures of Crofton, Inc. of Marian, Ind., for example. Typical of the specific materials used for filter foam are those sold by Scott Paper Company, Foam Division, Chester, Pa. The Scott filter foam is a completely open cell polyester-polyurethane foam. A more detailed disclosure of suitable foams for the apparatus and method of this invention will be found in the above-mentioned application, Ser. No. 154,800.

BRIEF DESCRIPTION OF THE INVENTION

The apparatus and method of the invention are structural and procedural combinations which utilize an open celled compressible hydrophobic polymeric form filtering or classifying element. The filtering element is provided in an apparatus combination with a compressing unit which compresses an area of the foam that has been loaded by solids removed from the stream passing therethrough. The polymeric foam material has an inherent resilience which when the compressing forces are released, causes the compressed area to expand to substantially its original size and shape. The apparatus and method of the invention include an element and procedure whereby the foam during expansion, and until presented for stream passage therethrough, maintains the cells in a substantially liquid, i.e., water, filled condition. This apparatus and procedure accordingly prevents a gas barrier or vapor lock from developing in the cellular structure of the foam. Such a vapor lock, if formed, would inhibit passage through the foam of the stream to be filtered.

Many forms of apparatus have been devised to accomplish this procedure, one of which involves a rotating drum surrounded by a urethane foam filtering element of more than one layer. A reticulate belt structure in the form of a flexible net of polymeric material rotates with the foam for part of its path of revolution and is also fixed to rotate about a driven rotational element separate from the foam. The rotational element is chain driven by an electric motor. A compressing roller is pivoted on a mechanical advantage providing arm to provide a compressing force on the multitude of areas of foam presented thereto by the rotating drum. The drum may be driven by the endless reticulate belt structure or by separate means synchronized therewith.

A tank or reservoir of the novel apparatus receives the waste or process stream containing suspended solids to be filtered, clarified or classified. Located in the reservoir is the lower portion of the rotating drum with foam mounted thereon. A pressure differential "ΔP" is created by the differential of liquid level on the inside of the drum and that in the reservoir outside the drum. The liquid flows through the reticulate polymeric net and then through the foam filtration element due to this pressure differential. Vacuum and separate pressure means may also be utilized for this purpose. As this flow continues, a matte of larger suspended solids is deposited on the polymeric net and smaller suspended elements from the stream are retained in the hydrophobic foam. The effluent or clarified stream is removed from inside the drum by pumping it through an axially disposed outlet passage.

The reticulate polymeric net material is loaded with larger solids and the foam is loaded with retained smaller solids as the drum rotates and a given area of foam moves to a position where the compressing element compresses that area of the foam, thereby removing from it the retained solids.

The retained solids stream is collected, for example, in a trough located within the drum directly under the point at which the foam is compressed. It is pumped from the trough in the drum to an axial passageway opening in a direction opposite from the direction of opening of the clarified stream passageway. This can be done either continuously or intermittently.

The rotating endless polymeric material net with the matte of solids thereon leaves the tank and breaks its contact with the foam for travel around a chain powered roller. A doctor blade or other suitable doctor device such as a spray or pneumatic knife removes the matte of solids and it is captured in a tank where it may be removed by means of a screw conveyor or otherwise be handled in a suitable manner.

A shower or other flooding or submerging means is provided in the structural combination to maintain the compressed and thus regenerated hydrophobic foam area in a substantially water filled condition during subsequent expansion of the area from the compressed state in order to prevent vapor lock.

It is clear that an endless belt apparatus rather than a rotating drum apparatus can be utilized as the structural combination to practice the process, as can liquid filled tanks with inner reciprocating filter element squeezing subcombinations which keep the filter totally submerged to avoid vapor lock. Inclined filter arrangements analogous to an inclined wire "save-all" are also contemplated.

The described apparatus of the invention may be provided with a suitable shower or other means to wash any retained matte materials from the rotationally driven polymeric net after it passes the doctor blade but before it re-enters the reservoir or tank. Also, a suitable tensioning device typically is provided to insure adequate tension is maintained to drive the polymeric net and rotating drum.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
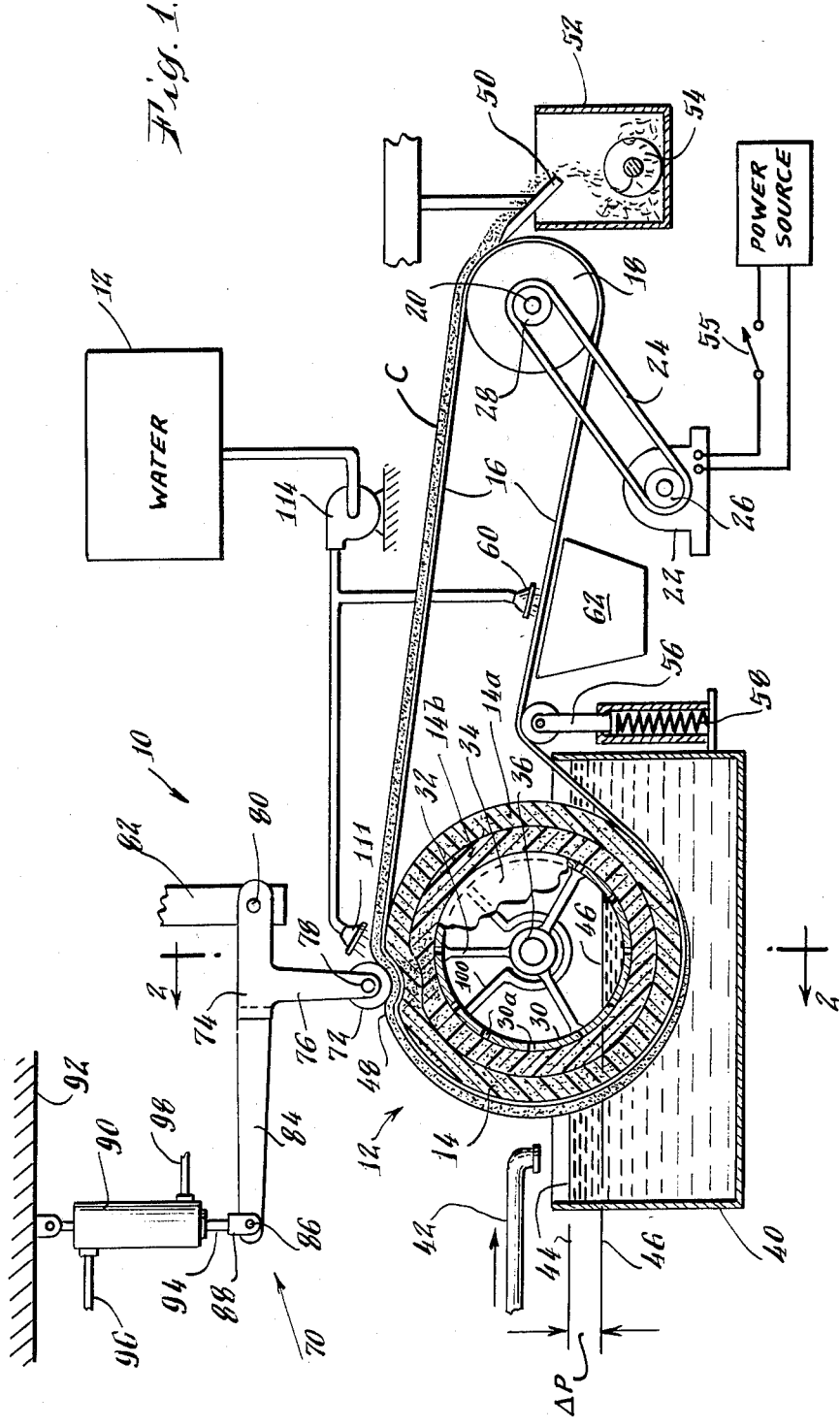
FIG. 1 is a side elevational view of an embodiment of the apparatus combination of the invention with certain of the elements schematically shown and broken away for clarity.

The numeral 10 generally designates a preferred embodiment of the apparatus for removing suspended solids from a stream in accordance with the principles of this invention. The apparatus 10 is generally organized to include a rotating drum means 12 having means to filter which includes an open celled compressible hydrophobic polymeric foam 14. Surrounding a portion of the foam 14 is a reticulate structure in the form of a flexible polymeric net material 16.

The material 16 defines an endless belt driven by a roller 18 rotating about shaft 20. A motor 22 drives the roller 18 by means of a chain 24 and sprockets 26 on the motors 22 and 28 on the shaft 20, respectively. As the belt 16 of polymeric material rotates, it overlies the surface of foam 14 and thereby drives the rotating drum means 12. In doing so, the net of polymeric material is exposed to the stream for at least part of its path of revolution.

Figure 2:
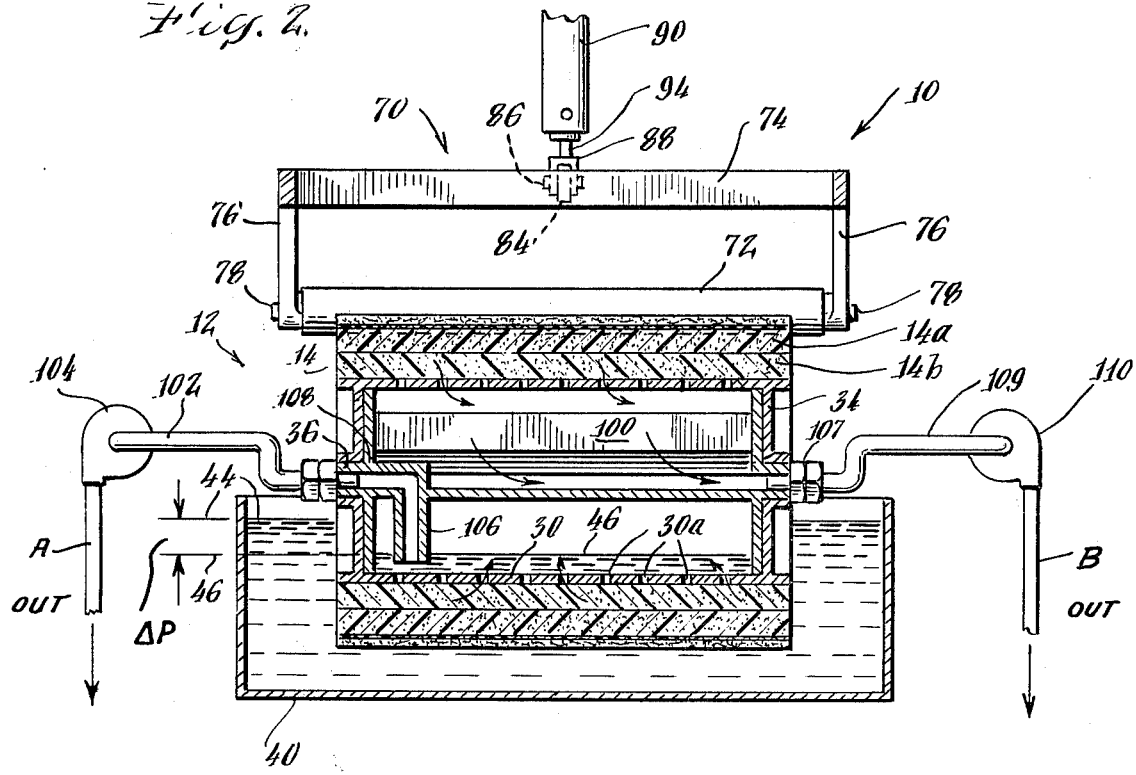
FIG. 2 is a cross sectional elevational view taken along line 2—2 of FIG. 1.

The foam 14 includes multiple layers 14a and 14b for reasons disclosed in the above-mentioned application Ser. No. 154,800. The drum means 12 includes an inner cylindrical shell 30 having a plurality of openings 30a for providing fluid communication therethrough. The shell 30 is supported for rotation on spokes 32 and includes end plates 34. Spokes 32 are connected to hollow hub means 36. The hollow hub means 36 is located on the left end of drum means 12, as shown in FIG. 2, and is connected to an outlet port and pipe through which effluent or clarified stream is pumped in a manner to be explained hereinafter.

The drum means 12, and its reticulate net covering of polymeric material 16, is partially submerged within the tank or reservoir 40. The tank 40 receives the waste or process stream containing the suspended solids from an inlet stream represented schematically by the pipe 42. The level of water containing suspended solids in the tank 40 on the outside of the hydrophobic foam 14 is at one height 44 and the effluent or clarified stream level inside of the foam 14 and shell 30 is at a different level 46. The difference in the head of pressure created thereby is illustrated in the drawing as ΔP and it is the pressure created by the difference in these levels which creates the flow through the filter means 14.

As the stream flows through the foam filter medium 14 it must first pass through the reticulate polymeric material of the endless web or belt 16. In so doing, a matte of large particle solids 48 is deposited on the net 16. As the endless web formed by the net polymeric material 16 rotates, the material 48 is carried from a position on the drum means 12 to a position adjacent the drive roller 18, or some other convenient point along its length, where a doctor blade or other means 50 separates the matte of the solids stream 48 from the web 16. The doctor means 50 can be, for example, of a nylon or other plastic material or it can be a water spray or what is known in the art as a pneumatic knife. The doctor blade 50 may be associated with a chute, or may itself act as a chute, to direct the matte of large particle solids into a receptacle 52 having a screw conveyor 54 or other suitable means for handling material 48.

The drive motor 22 moves the drum means 12 by means of the web of polymeric material 16. This drive may be either intermittent or continuous, at the election of the operator by use of a switching means schematically shown at 55. A suitable tensioning means 56 insures that there is sufficient driving engagement of the endless web 16 against the surface of the foam filter medium 14 to create positive rotational drive thereof. The tensioning means is schematically illustrated as being spring biased by spring 58 but any mechanical equivalent well known to those in the art may be utilized for this purpose.

In placing the doctor blade 50 or equivalent means described above in operative position relative to the matte 48 on the web 16, it should be borne in mind that other locations give the benefit of utilization of gravity and cleaning of the web 16. In this regard, a shower means 60 is provided for backwashing any residual of the large suspended solids matte 48 on the web 16 before its re-entrance into the tank 40. Shower means 60 can be provided with a catch basin or other receptacle 62 to retain the material removed from the web 16 thereby.

The filtration drum 12 includes in association therewith, a compressing means generally designated by the numeral 70. The compressing means 70 compresses the foam 14 against the cylindrical shell 30 as the shell 30 and the foam 14 mounted thereon rotates relative thereto. The compressing means 70 includes a compressing roller 72 mounted on a horizontal yoke 74 which has a vertical arm 76 at either end thereof. The compressing roller 72 spans the distance between the vertical arms 76 for rotation about stub shafts 78 at the lower ends thereof. The yoke 74 is pivotally mounted about pivot point 80 on a fixed support structure 82.

The yoke 74 includes an elongated lever arm 84 which is pivotally attached at its remote end by means of pivot pin 86 and bracket 88 to the lower end of a hydraulic cylinder means 90. The cylinder means 90 is affixed to a fixed support 92 so that its piston rod 94 can reciprocate in response to flow through inlet and outlet means 96 and 98, respectively, and thereby selectively supply pressure to the foam 14 by means of the roller 72 as the yoke 74 pivots about point 80. Other arrangements for creating substantially radial motion to compress the foam 14 could be utilized including a direct connection of a compressing means to a piston rod of the type illustrated at 94. It is desirable, in any event, however, to have some means to provide a mechanical advantage such as the lever arm 84, as well as some means to provide a controlled compressing function such as is provided by conventional fluid cylinder 90 when mounted in a typical hydraulic or pneumatic control circuit (not shown). The tensioning means 56 acts to compensate for tension changes due to roller 72 acting on the net 16 and foam 14.

By compressing the hydrophobic foam 14, the roller 72, because of the relative rotational motion, intermittently compresses each of the multitude of areas of foam around the periphery of the foam. In so doing, the solids loaded in the foam from the stream which is passed through it are removed. This flow through the openings 30a ends in a trough 100 which acts as a means to collect the solids removed from the foam by compression. The retained solids stream is kept from the effluent or clarified stream by means of the shape of the trough 100 which surrounds the axis of rotation of the drum means 12 on the end of the drum opposite the outlet opening through which the effluent or clarified stream is pumped. This arrangement is best seen in FIG. 2. The hub 36 of the drum means 12 is hollow and is connected to an outlet pipe 102 through which a pump 104 pumps the effluent or clarified material 46. The inner passageway of the effluent or clarified stream 46, as shown, is a vertical pipe 106 in communication with the hollow hub 36 by means of a horizontal portion 108. The effluent or clarified stream 46 moves through the vertical pipe 106, the horizontal portion 108, out through hollow hub 36, and into passageway 102, under the action of the pump 104. From the pump 104, the effluent or clarified stream can be returned to its source or recycled for further clarification and treatment or, in the case of a process stream, it may be collected as an end or intermediate product.

The retained solids stream which is removed from the foam by the compressing means 70 and driven through the openings 30a in the shell to the trough 100, moves axially out of a hollow hub 107, and through an outlet pipe 109 connected thereto, by means of a pump 110. All of the latter are located on the end of the rotating drum means 12 opposite the end from which the effluent or clarified stream 46 flows. Thus, an outlet stream A is the effluent or clarified stream flowing from pump 104 in FIG. 2 and a retained solids stream B is the discharged stream from the pump 110 on the right side of the apparatus as seen in FIG. 2. The matte of solids stream C is removed at the right side of FIG. 1 and the waste or process stream with suspended solids initially enters the system through the pipe 42 on the left side of FIG. 1.

An important feature of the invention is the means to maintain the foam area in a substantially water filled condition during expansion of the foam area from the compressed state. This occurs just after the rotating drum means 12 moves any given surface area of the hydrophobic foam 14 out from under the compressing influence of roller 72 and is accomplished in the illustrated example by shower means 111. Shower means 111 may be connected to a source of water 112 and a pump 114 in common with the shower 60 cleaning the polymeric net material 16. It should be clear that separate means and supplies of water for maintaining the foam area in a substantially water filled injected, sprayed, flooded or submerged condition can be provided.

In an alternative embodiment, the entire rotating drum could be submerged, for example, so that the shower 111 would not be needed. The tank in which the rotating drum was submerged would in that case be the means to maintain the foam in a substantially water filled condition. Alternatively, a plate and frame press arrangement similar to those used for filtering purposes could be kept in submerged condition within a tank. Also, it would be possible to use a disc filter arrangement in which the liquid above the hydrophobic filter medium would keep it in water filled condition during expansion of the area from the compressed state given to it during the step of removal of the loaded solids from the foam filter medium. Moreover, it will be obvious to those skilled in the art that the rotating drum means 12 can be easily converted to an endless belt arrangement, it being important to note, however, that the cylinder drum has certain structural advantages in supporting the weight of the water loaded foam material.

The layers 14a and 14b of the foam medium are illustrated by way of example. It would clearly be possible, for example, for the hydrophobic foam 14 to be in the form of a foam sleeve 12 feet in diameter by 18 feet long by 6 to 8 inches deep. This sleeve could be fabricated in modular sections which could then be assembled either at the manufacturer's or on site. The foam filter medium also could be supplied as a fully fabricated part or as a partially fabricated length which would be spirally wound on site about the drum shell 30. For this latter medium, a careful controlling of tension would be desired to minimize foam compression at the inner surface.

A method for imparting improved X and Y direction stability to the hydrophobic foam is also contemplated by means of utilization of a flame bonding of a plastic scrim to the entire length of foam. Other considerations have been made to provide laminations of foam layers to a metal or plastic section which would then be fitted to the cylindrical shell 30. Moreover, it has been found that a PVC coating would impart a greater dimensional stability and improved chemical resistance if used in connection with the foam, and if it is available in the 80 to 100 ppi sizes that are desirable for use as filter foam in commercially utilizing the invention.

Figure 3:
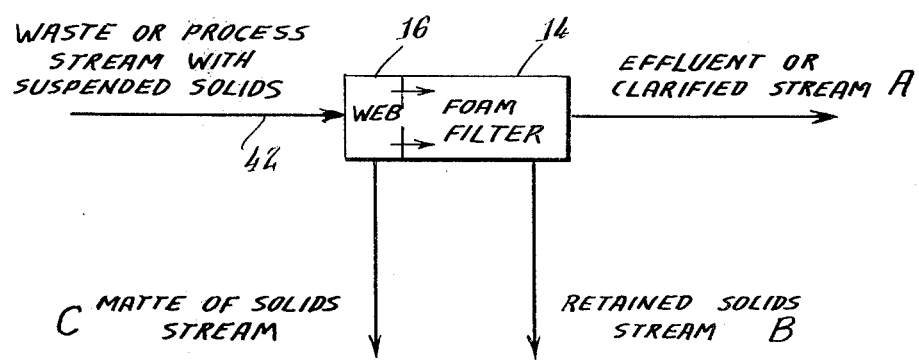
FIG. 3 is a process flow diagram of the invention.

Thus, it will be seen as illustrated, for example, in FIG. 3 of the drawings, a waste or process stream typically having total suspended solids of 120 parts per million could be treated by the apparatus and method of the invention. The stream would first pass through the net of polymeric material 16 leaving the retained solids stream C. In the case of white water from a paper manufacturing operation, on the polymeric net material 16, this typically would be the equivalent of 80 ppm of fiber based on the influent. The foam filter element would retain solids for removal by compression typically in the amount of 20 ppm of titanium dioxides, clay fillers and other typical white water constituents based on the influent. A clarified stream having, for example, 20 ppm remaining would be available for recycling in the papermaking process.

Utilizing this example, those skilled in the art will realize that in papermaking, costs savings in fiber and in clay fillers, etc., will be realized as well as savings in make-up water. It is contemplated that the hydrophobic foam filter medium will provide a significantly long lived material, which is anticipated, for example, to be of a duration of at least six months.

A novel and efficient method and apparatus for removing suspended solids form a stream has been provided in which a waste or process stream is divided into three product streams. The system provides economies of cost of both operation and maintenance in the process of filtration or classification of the stream.

What is claimed is:

1. In an apparatus for removing suspended solids from a stream, the structural combination comprising:
    means to filter which includes an open-celled compressible hydrophobic polymeric foam through which said stream flows
    means intermittently to compress an area of said hydrophobic foam to remove solids loaded therein, and
    means to maintain said hydrophobic foam area in a substantially water filled condition during expansion of said area from the compressed state.

2. The apparatus of claim 1 in which said hydrophobic foam and said means intermittently to compress an area of said foam have relative motion created by at least one of said means rotating.

3. The apparatus of claim 2 in which means maintain said relative motion continuously.

4. The apparatus of claim 2 in which means maintain said relative motion intermittently.

5. The apparatus of claim 1 in which said hydrophobic foam is mounted on a rotationally driven element.

6. The apparatus of claim 5 in which said means intermittently to compress an area of said hydrophobic foam continuously compresses the hydrophobic foam as it rotates, thereby intermittently to compress the multitude of areas about the periphery of the hydrophobic foam.

7. The apparatus of claim 5 in which said hydrophobic foam has a reticulate structure overlying its surface exposed to said stream and said reticulate structure is flexible and rotates with said hydrophobic foam for at least part of its path of revolution.

8. The apparatus of claim 7 in which said reticulate structure is a flexible net of polymeric material.

9. The apparatus of claim 7 in which said reticulate structure rotates about an element spaced from said hydrophobic foam.

10. The apparatus of claim 7 in which means to collect solids deposited on said reticulate structure from said stream are included.

11. The apparatus of claim 10 in which said means to collect solids deposited on said reticulate structure includes a doctor blade.

12. The apparatus of claim 10 in which said means to collect solids deposited on said reticulate structure includes a spray.

13. The apparatus of claim 10 in which said means to collect solids deposited on said reticulate structure is a pneumatic doctor device.

14. The apparatus of claim 1 in which means to collect the solids removed from said hydrophobic foam by compressing are included.

15. The apparatus of claim 1 in which said hydrophobic foam has a reticulate structure overlying its surface exposed to said stream.

16. The apparatus of claim 1 in which a means to create a pressure differential on opposite sides of said hydrophobic foam is included.

17. The apparatus of claim 1 in which means utilizing pressure to flow said stream through said hydrophobic foam is included and said pressure is formed by a reservoir of liquid of the stream being located on the outer side of said hydrophobic foam.

18. The apparatus of claim 1 in which means utilizing vacuum to flow said stream through said hydrophobic foam is included.

19. The apparatus of claim 1 in which the hydrophobic foam is in the form of an endless belt and rotates.

20. The apparatus of claim 1 in which the means to maintain said hydrophobic foam area in a substantially water filled condition during expansion of said area from the compressed state includes means keeping said area submerged during said expansion.

21. The apparatus of claim 1 in which the means to maintain said hydrophobic foam area in a substantially water filled condition during expansion of said area from the compressed state includes shower means for flooding said area.

22. The apparatus of claim 1 in which the means to maintain said hydrophobic foam area in a substantially water filled condition during expansion of said area from the compressed state includes means which force liquid into said hydrophobic foam area.

23. The method of removing fine solids from a stream comprising the procedural combination of steps of passing said stream through open-celled compressible hydrophobic polymeric foam material, compressing said hydrophobic foam to remove the solids loaded therein, expanding said compressed hydrophobic foam while maintaining it in a substantially water filled condition and repeating said steps.

24. The method of claim 23 in which the stream passing through said hydrophobic foam is collected.

25. The method of claim 23 in which the fine solids removed from said hydrophobic foam material are collected.

26. The method of claim 23 in which the step of passing said stream through a reticulate material is performed on the stream before the step of passing said stream through hydrophobic foam material and a step of removing material left by said stream on said reticulate material as said stream passes therethrough to said hydrophobic foam is included.

* * * * *